(12) United States Patent
Gopinath et al.

(10) Patent No.: US 10,102,119 B2
(45) Date of Patent: Oct. 16, 2018

(54) GARBAGE COLLECTION BASED ON QUEUED AND/OR SELECTED WRITE COMMANDS

(71) Applicant: SanDisk Technologies Inc., Plano, TX (US)

(72) Inventors: Raja Alwar Gopinath, Bangalore (IN); Daniel Edward Tuers, Kapaa, HI (US); Nicholas Thomas, Sunnyvale, CA (US); Abhijeet Manohar, Bangalore (IN)

(73) Assignee: SanDisk Technologies LLC, Plano, TX (US)

( * ) Notice: Subject to any disclaimer, the term of this patent is extended or adjusted under 35 U.S.C. 154(b) by 49 days.

(21) Appl. No.: 14/929,020

(22) Filed: Oct. 30, 2015

(65) Prior Publication Data
US 2017/0123972 A1    May 4, 2017

(51) Int. Cl.
*G06F 12/02* (2006.01)
*G06F 3/06* (2006.01)

(52) U.S. Cl.
CPC ........ *G06F 12/0253* (2013.01); *G06F 3/0619* (2013.01); *G06F 3/0659* (2013.01); *G06F 3/0688* (2013.01); *G06F 2212/7201* (2013.01); *G06F 2212/7205* (2013.01)

(58) Field of Classification Search
CPC ...... G06F 12/00; G06F 12/02; G06F 12/0253; G06F 3/06; G06F 3/0659; G06F 3/0688; G06F 3/0619
See application file for complete search history.

(56) References Cited

U.S. PATENT DOCUMENTS

| | | | |
|---|---|---|---|
| 7,103,723 B2 * | 9/2006 | Cierniak | G06F 8/4434 707/999.202 |
| 9,189,392 B1 * | 11/2015 | Neppalli | G06F 3/064 |
| 2007/0033376 A1 * | 2/2007 | Sinclair | G06F 3/0605 711/203 |
| 2015/0026391 A1 * | 1/2015 | Su | G06F 12/0246 711/103 |

* cited by examiner

*Primary Examiner* — Tuan Thai
(74) *Attorney, Agent, or Firm* — Brinks Gilson & Lione

(57) ABSTRACT

A non-volatile memory system may include a write task queue that queues write commands and a garbage collection module that analyzes information about pending write commands in the write task queue in order to perform garbage collection. Based on its analysis of the write task queue, the garbage collection module performs discouraging actions to discourage itself from selecting certain blocks in a candidate list to be source blocks for garbage collection. In addition or alternatively, the garbage collection module performs encouraging actions to encourage itself to select blocks storing current valid data associated with a write command as source blocks for garbage collection. Write amplification may be reduced as a result of the discouraging and encouraging actions.

16 Claims, 7 Drawing Sheets

GARBAGE COLLECTION BASED ON QUEUED AND/OR SELECTED WRITE COMMANDS

BACKGROUND

In non-volatile memory systems, data may be stored in the memory and subsequently, new versions of the data may be written in different storage areas, causing the old versions of the data to be obsolete. During the course of operation of the memory system, as write operations are performed, storage areas (e.g., blocks) in the memory may include all obsolete data or a combination of valid data and obsolete data. In order to free up storage space, the memory system may perform a garbage collection process in which valid data is collected together and moved to a different storage area, where it is stored in a generally more compacted way. The initial storage area may then be erased, which may make available storage space for new data.

The more and more times blocks or other storage areas are programmed and erased, the health of the memory degrades. Further, the greater the number of times memory interfaces are accessed in order to move data to execute write commands, the worse the write performance and efficiency of the memory system. Ways to improve efficiency and reduce write amplification may be desirable, including those ways that pertain to garbage collection.

BRIEF DESCRIPTION OF THE DRAWINGS

The accompanying drawings, which are incorporated in and constitute a part of this specification illustrate various aspects of the invention and together with the description, serve to explain its principles. Wherever convenient, the same reference numbers will be used throughout the drawings to refer to the same or like elements.

DETAILED DESCRIPTION OF THE PRESENTLY PREFERRED EMBODIMENTS

Overview

Figure 1A:
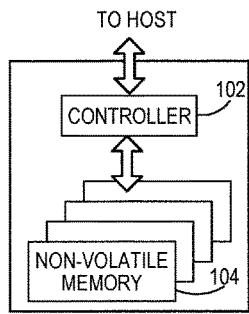
FIG. 1A is a block diagram of an exemplary non-volatile memory system.

Embodiments of the present invention are defined by the claims, and nothing in this section should be taken as a limitation on those claims.

By way of introduction, the following embodiments describe non-volatile memory systems and related methods of performing garbage collection based on write commands pending in a write task queue and/or selected for execution. In a first example embodiment, a non-volatile memory system may include non-volatile memory and a controller. The controller may be configured to identify a first block in a candidate list for performance of a discouraging action that discourages the controller from selecting the first block for transfer of first data in the first block to a different storage area. The identification of the first block may be based on a write command queued in a write task queue. In addition, the controller may be configured to perform the discouraging action associated with the first block, and after performance of the discouraging action, select a second block in the candidate list for transfer of second data in the second block to the different storage area. The second block may have a lower ranking than a ranking of the first block in the candidate list. The controller may further be configured to communicate with the non-volatile memory to transfer the second data in the second block to the different storage area.

In some example embodiments, the controller may be configured to associate the first block with the write command queued in the write task queue, and in response to the association, determine whether the first block is in the candidate list. The controller may also be configured to identify the first block for performance of the discouraging action in response to a determination that the first block is in the candidate list.

In some example embodiments, the determination of whether the first block is in the candidate list may include a determination of whether the first block is in an active pool of the candidate list.

In some example embodiments, the controller may be configured to analyze the write task queue, identify physical address information associated with the write command in response to the analysis, and determine that a current version of data requested to be written by the write command comprises the first data in the first block based on the identification of the physical address information. The controller may further be configured to associate the first block with the write command based on the determination that the current version of the data requested to be written comprises the first data in the first block.

In some example embodiments, the controller may be configured to analyze the write task queue in response to a triggering event, where the triggering event may include an expiration of a time period, an update event indicative of a possible update to the candidate list, or a queuing of a new write command in the write task queue.

In some example embodiments, the controller may be configured to perform the discouraging action by lowering the ranking of the first block to an artificially low ranking.

In some example embodiments, the controller may be configured to perform the discouraging action by removing the first block from the candidate list.

In some example embodiments, the controller may be configured to perform the discouraging action by appending a tag to an entry of the first block in the candidate list that indicates to the controller not to select the first block for the transfer of its data to the different storage area, or adding the first block to a do not select list.

In some example embodiments, the transfer of the second data to the different storage area may be part of a garbage collection process, and the controller may be configured to erase the second block after the transfer of the second data as part of the garbage collection process In some example embodiments, the controller may be further configured to write data associated with the write command into the second block after the second block is erased.

In another example embodiment, a method may include: identifying, with a controller of a non-volatile memory system, a write command in a write task queue that is requesting first data to be written to non-volatile memory; and identifying, with the controller, a first block of the non-volatile memory storing a current version of the first data, where the first block may be in a garbage collection candidate list. The method may also include, based on identifying the first block as storing the current version of the first data, selecting, with the controller, a second block in the garbage collection candidate list as a source block instead of the first block for a garbage collection process, where the second block may have a lower ranking than a ranking of the first block in the candidate list; and transferring, with the controller, second data stored in the second block to a destination block to perform the garbage collection process.

In some example embodiments, the controller may sort the garbage collection candidate list to discourage the controller from selecting the first block as a source block for the garbage collection process in response to identifying the first block as storing the current version of the first data.

In another example embodiment, a non-volatile memory system may include non-volatile memory, and a controller. The controller may be configured to determine to perform garbage collection in order for a write command requesting storage of first data in the non-volatile memory to be executed; identify a first block of the non-volatile memory storing at least some of a current version of the first data; transfer, to a second block of the non-volatile memory, second data stored in the first block but not the at least some of the current version of the first data, the second data being unassociated with the write command; and after the transfer of the second data to the second block, write the first data to the first block to execute the write command.

In some example embodiments, the controller may be configured to select the first block based on an unassociated validity count of the first block.

In some example embodiments, the controller may be configured to: determine a plurality of blocks that are each storing portions of a current version of the first data, where the first block is one of the plurality of blocks; compare the unassociated validity count of the first block with unassociated validity counts of the other of the plurality of blocks; and select the first block for transfer of second data but not the at least some of the current version of the first data set being stored in the first block to the second block based on the transfer.

In some example embodiments, the unassociated validity count of the first block may include a lowest unassociated validity count compared to the unassociated validity counts of the other of the plurality of blocks.

In some example embodiments, the controller may be configured to: compare the unassociated validity count of the first block with unassociated validity counts of blocks identified in a garbage collection candidate list; and select the first block for transfer of the second data but not the at least some of the current version of the first data set being stored in the first block to the second block based on the comparison.

In some example embodiments, the controller may be configured to: compare at least one of a size of the first data with a size threshold or a spread of the current version of the first data with a spread threshold, and determine whether to identify which blocks in the non-volatile memory are storing the current version of the first data based on the comparison.

In some example embodiments, the write command may be a first write command and the size threshold may be a first size threshold. The controller may further be configured to: determine a sum data size of data requested to be written by pending write commands in a write task queue when the size of the first data is below the size threshold or the spread of the current version of the first data is above spread threshold; determine whether the sum data size exceeds a second size threshold; in response to a determination that the sum data size exceeds the second size threshold, associate a third block identified in the write task queue with a second write command queued in the write task queue; and in response to the association, perform a discouraging action that discourages the controller from selecting the third block for transfer of third data in the third block to a fourth block.

In some example embodiments, the second data may include only valid data.

Other embodiments are possible, and each of the embodiments can be used alone or together in combination. Accordingly, various embodiments will now be described with reference to the attached drawings.

Exemplary Embodiments

The following embodiments describe non-volatile memory systems and related methods of performing garbage collection based on write commands pending in a write task queue and/or selected for execution. Before turning to these and other embodiments, the following paragraphs provide a discussion of exemplary non-volatile memory systems and storage modules that can be used with these embodiments. Of course, these are just examples, and other suitable types of non-volatile memory systems and/or storage modules can be used.

FIG. 1A is a block diagram illustrating a non-volatile memory system 100. The non-volatile memory system 100 may include a controller 102 and non-volatile memory that may be made up of one or more non-volatile memory dies 104. As used herein, the term die refers to the set of non-volatile memory cells, and associated circuitry for managing the physical operation of those non-volatile memory cells, that are formed on a single semiconductor substrate. The controller 102 may interface with a host system and transmit command sequences for read, program, and erase operations to the non-volatile memory die(s) 104.

The controller 102 (which may be a flash memory controller) can take the form of processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. Alternatively, the host can provide the physical address. The flash memory controller can also perform various memory management functions, such as, but not limited to, wear leveling (distributing writes to avoid wearing out specific blocks of memory that would otherwise be repeatedly written to) and garbage collection (moving only valid pages of data to a new block, so the full block can be erased and reused). As used herein, data being stored may be either valid or invalid (otherwise referred to as obsolete). Data is valid if it is the most recent version or copy of the data (i.e., there is not a more recent version or copy located somewhere else in the memory dies 104). On the other hand, invalid or obsolete data is not the most recent version or copy. Garbage collection is described in further detail below.

The interface between the controller 102 and the non-volatile memory die(s) 104 may be any suitable flash interface, such as Toggle Mode 200, 400, or 800. In one embodiment, the memory system 100 may be a card based system, such as a secure digital (SD) or a micro secure digital (micro-SD) card. In an alternate embodiment, the system 100 may be part of an embedded memory system.

Although in the example illustrated in FIG. 1A, the non-volatile memory system 100 may include a single channel between the controller 102 and the non-volatile memory die(s) 104, the subject matter described herein is not limited to having a single memory channel. For example, in some NAND memory system architectures, 2, 4, 8 or more NAND channels may exist between the controller and the NAND memory die(s) 104, depending on controller capabilities. In any of the embodiments described herein, more than a single channel may exist between the controller and the memory die(s) 104, even if a single channel is shown in the drawings.

Figure 1B:
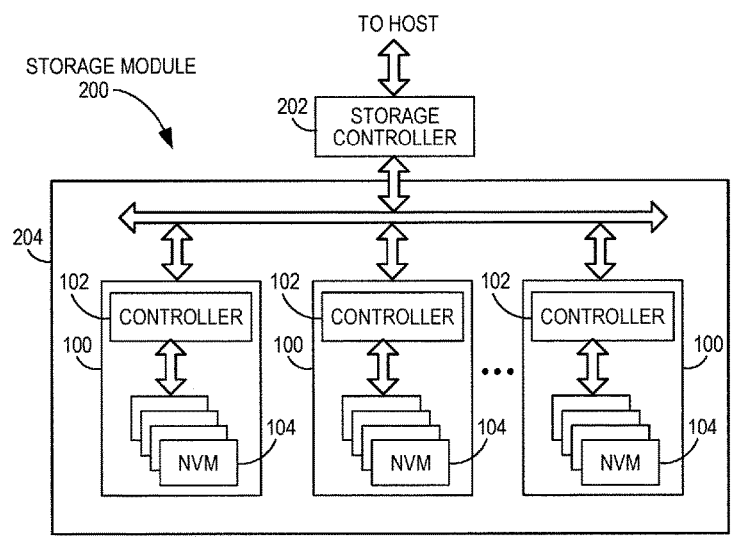
FIG. 1B is a block diagram of a storage module that includes a plurality of non-volatile memory systems.

FIG. 1B illustrates a storage module 200 that includes plural non-volatile memory systems 100. As such, the storage module 200 may include a storage controller 202 that interfaces with a host and with a storage system 204, which includes a plurality of non-volatile memory systems 100. The interface between the storage controller 202 and non-volatile memory systems 100 may be a bus interface, such as a serial advanced technology attachment (SATA), a peripheral component interface express (PCIe) interface, an embedded MultiMediaCard (eMMC) interface, a SD interface, or a Universal Serial Bus (USB) interface, as examples. The storage system 200, in one embodiment, may be a solid state drive (SSD), such as found in portable computing devices, such as laptop computers and tablet computers, and mobile phones.

Figure 1C:
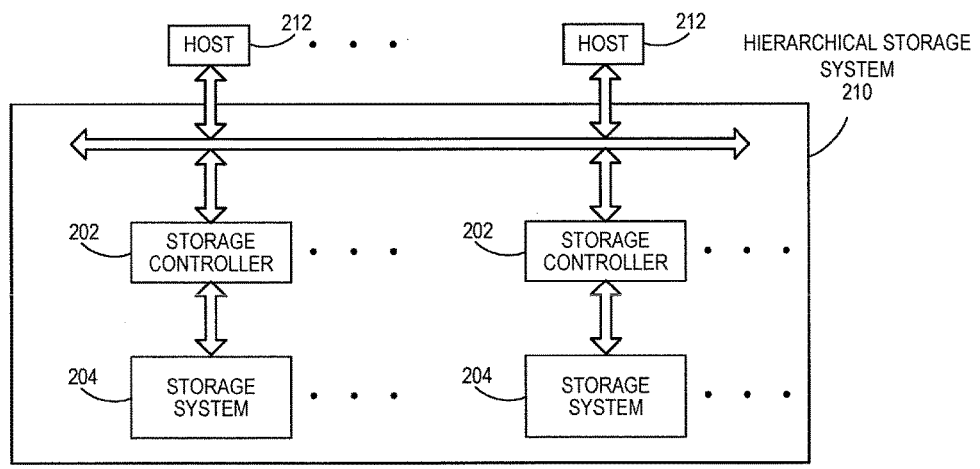
FIG. 1C is a block diagram of a hierarchical storage system.

FIG. 1C is a block diagram illustrating a hierarchical storage system 210. The hierarchical storage system 210 may include a plurality of storage controllers 202, each of which control a respective storage system 204. Host systems 212 may access memories within the hierarchical storage system 210 via a bus interface. Example bus interfaces may include a non-volatile memory express (NVMe), a fiber channel over Ethernet (FCoE) interface, an SD interface, a USB interface, a SATA interface, a PCIe interface, or an eMMC interface as examples. In one embodiment, the storage system 210 illustrated in FIG. 1C may be a rack mountable mass storage system that is accessible by multiple host computers, such as would be found in a data center or other location where mass storage is needed.

Figure 2A:
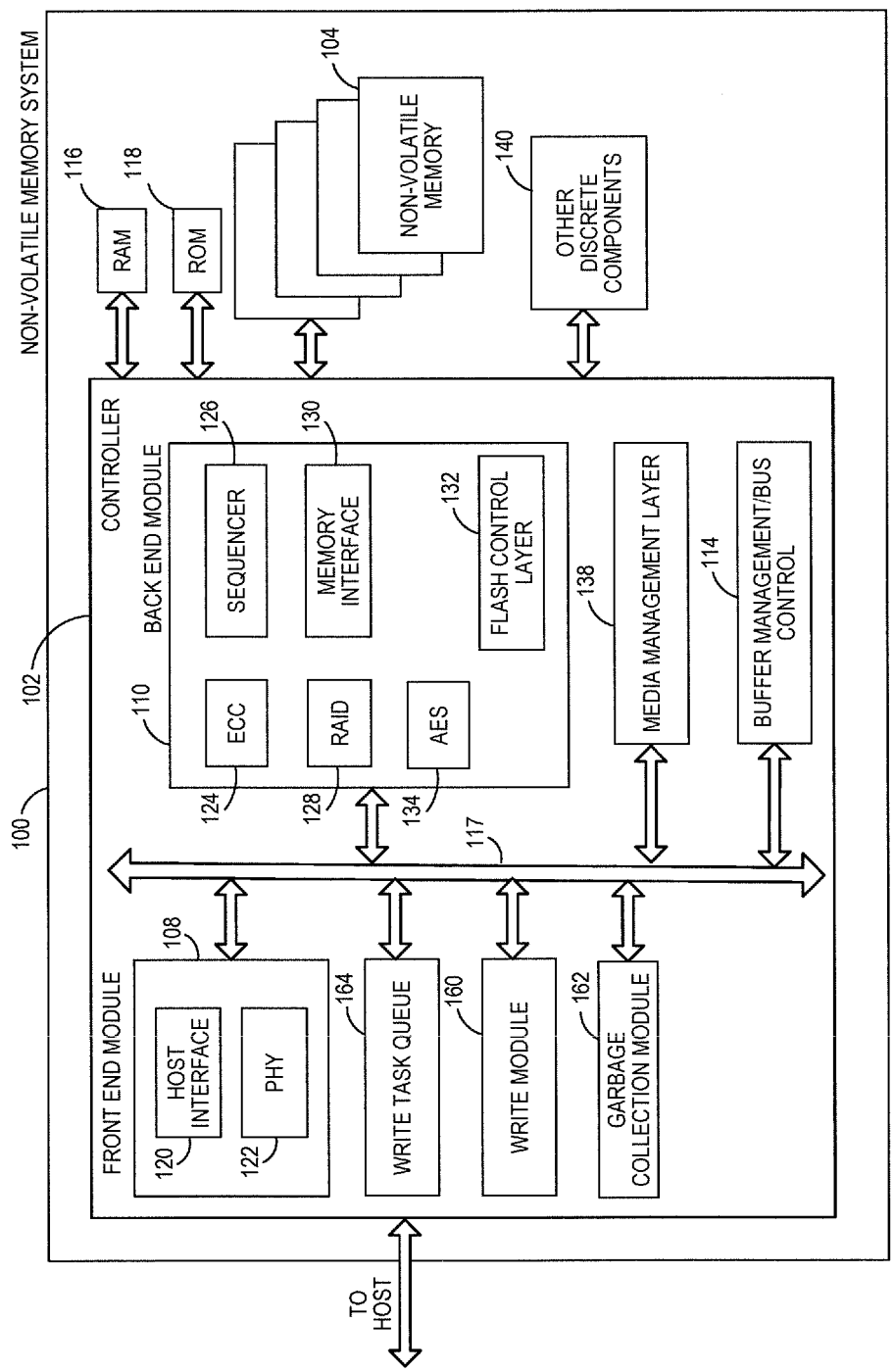
FIG. 2A is a block diagram of exemplary components of a controller of the non-volatile memory system of FIG. 1A, including a write module and a garbage collection module that may utilize a write task queue.

FIG. 2A is a block diagram illustrating exemplary components of the controller 102 in more detail. The controller 102 may include a front end module 108 that interfaces with a host, a back end module 110 that interfaces with the non-volatile memory die(s) 104, and various other modules that perform various functions of the non-volatile memory system 100. In general, a module may be hardware or a combination of hardware and software. For example, each module may include an application specific integrated circuit (ASIC), a field programmable gate array (FPGA), a circuit or circuitry, a digital logic circuit, an analog circuit, a combination of discrete circuits, gates, or any other type of hardware or combination thereof. In addition or alternatively, each module may include memory hardware that comprises instructions executable with a processor or processor circuitry to implement one or more of the features of the module. When any one of the module includes the portion of the memory that comprises instructions executable with the processor, the module may or may not include the processor. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 102 may include a buffer manager/bus controller module 114 that manages buffers in random access memory (RAM) 116 and controls the internal bus arbitration for communication on an internal communications bus 117 of the controller 102. A read only memory (ROM) 118 may store and/or access system boot code. Although illustrated in FIG. 2A as located separately from the controller 102, in other embodiments one or both of the RAM 116 and the ROM 118 may be located within the controller 102. In yet other embodiments, portions of RAM 116 and ROM 118 may be located both within the controller 102 and outside the controller 102. Further, in some implementations, the controller 102, the RAM 116, and the ROM 118 may be located on separate semiconductor dies.

Additionally, the front end module 108 may include a host interface 120 and a physical layer interface (PHY) 122 that provide the electrical interface with the host or next level storage controller. The choice of the type of the host interface 120 can depend on the type of memory being used. Example types of the host interface 120 may include, but are not limited to, SATA, SATA Express, SAS, Fibre Channel, USB, PCIe, and NVMe. The host interface 120 may typically facilitate transfer for data, control signals, and timing signals.

The back end module 110 may include an error correction controller (ECC) engine 124 that encodes the data bytes received from the host, and decodes and error corrects the data bytes read from the non-volatile memory die(s) 104. The back end module 110 may also include a command sequencer 126 that generates command sequences, such as program, read, and erase command sequences, to be transmitted to the non-volatile memory die(s) 104. Additionally, the back end module 110 may include a RAID (Redundant Array of Independent Drives) module 128 that manages generation of RAID parity and recovery of failed data. The RAID parity may be used as an additional level of integrity protection for the data being written into the non-volatile memory system 100. In some cases, the RAID module 128 may be a part of the ECC engine 124. A memory interface 130 provides the command sequences to the non-volatile memory die(s) 104 and receives status information from the non-volatile memory die(s) 104. Along with the command sequences and status information, data to be programmed into and read from the non-volatile memory die(s) 104 may be communicated through the memory interface 130. In one embodiment, the memory interface 130 may be a double data rate (DDR) interface, such as a Toggle Mode 200, 400, or 800 interface. A flash control layer 132 may control the overall operation of back end module 110.

Additional modules of the non-volatile memory system 100 illustrated in FIG. 2A may include a media management layer 138, which performs wear leveling of memory cells of the non-volatile memory die(s) 104. The non-volatile memory system 100 may also include other discrete components 140, such as external electrical interfaces, external RAM, resistors, capacitors, or other components that may interface with controller 102. In alternative embodiments, one or more of the RAID module 128, media management layer 138 and buffer management/bus controller 114 are optional components that may not be necessary in the controller 102.

Additional modules of the non-volatile memory system 100 illustrated in FIG. 2A may also include a write module 160, a garbage collection module 162, and a write task queue 164. These modules are shown as separate from the other modules of the non-volatile memory system 100, although in other configurations, one or more of them may be part of any of the other modules.

Figure 2B:
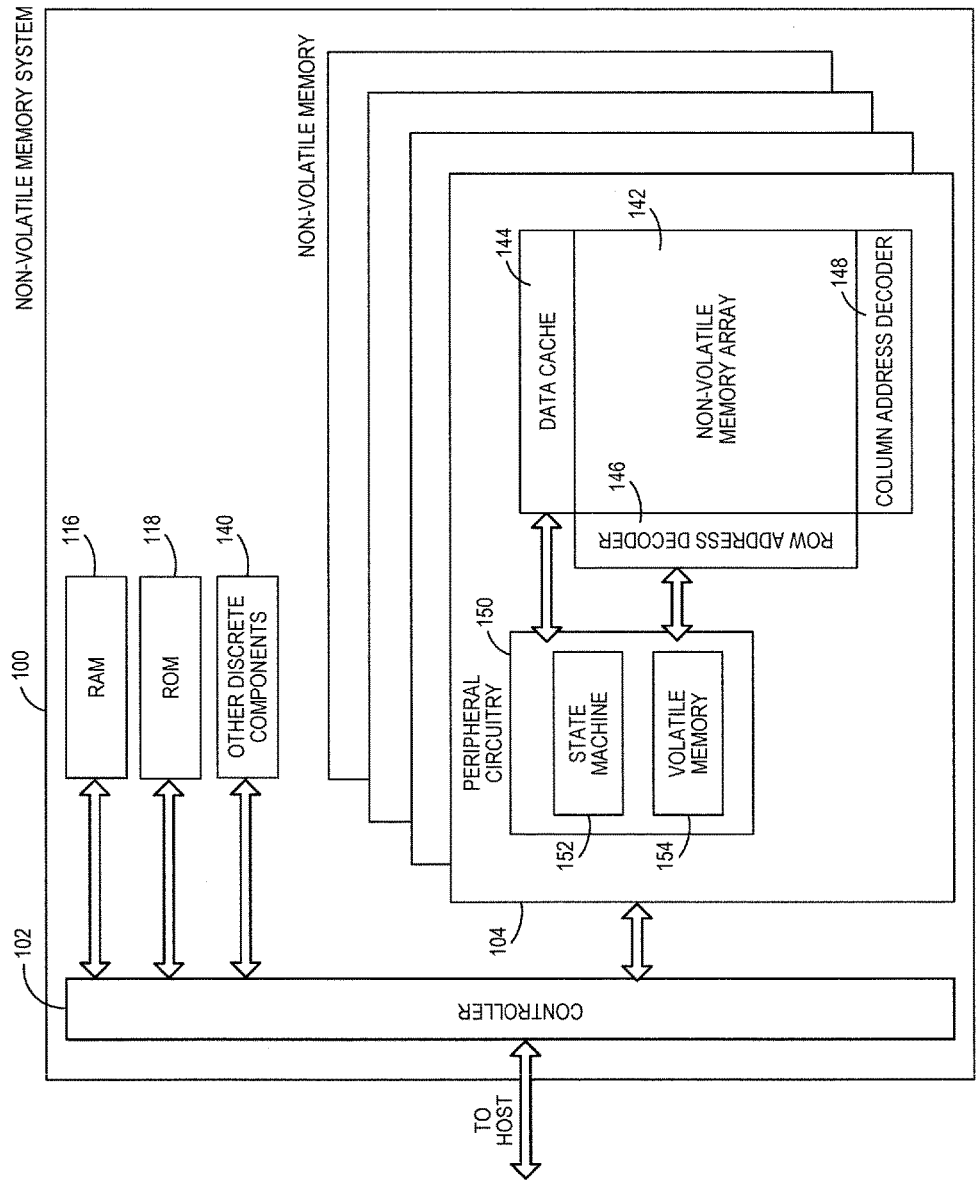
FIG. 2B is a block diagram of exemplary components of a non-volatile memory die of the non-volatile memory system of FIG. 1A.

FIG. 2B is a block diagram illustrating exemplary components of a non-volatile memory die 104 in more detail. The non-volatile memory die 104 may include a non-volatile memory array 142. The non-volatile memory array 142 may include a plurality of non-volatile memory elements or cells, each configured to store one or more bits of data. The non-volatile memory elements or cells may be any suitable non-volatile memory cells, including NAND flash memory cells and/or NOR flash memory cells in a two dimensional and/or three dimensional configuration. The memory cells may take the form of solid-state (e.g., flash) memory cells and can be one-time programmable, few-time programmable, or many-time programmable. In addition, the memory elements or cells may be configured as single-level cells (SLCs) that store a single bit of data per cell, multi-level cells (MLCs) that store multiple bits of data per cell, or combinations thereof. For some example configurations, the multi-level cells (MLCs) may include triple-level cells (TLCs) that store three bits of data per cell.

Additionally, a flash memory cell may include in the array 142 a floating gate transistor (FGT) that has a floating gate and a control gate. The floating gate is surrounded by an insulator or insulating material that helps retain charge in the floating gate. The presence or absence of charges inside the floating gate may cause a shift in a threshold voltage of the FGT, which is used to distinguish logic levels. That is, each FGT's threshold voltage may be indicative of the data stored in the memory cell. Hereafter, FGT, memory element and memory cell may be used interchangeably to refer to the same physical entity.

The memory cells may be disposed in the memory array 142 in accordance with a matrix-like structure of rows and columns of memory cells. At the intersection of a row and a column is a FGT (or memory cell). A column of FGTs may be referred to as a string. FGTs in a string or column may be electrically connected in series. A row of FGTs may be referred to as a page. Control gates of FGTs in a page or row may be electrically connected together.

The memory array 142 may also include wordlines and bitlines connected to the FGTs. Each page of FGTs is connected to a wordline. In particular, each wordline may be connected to the control gates of FGTs in a page. In addition, each string of FGTs may be coupled to a bitline. Further, a single string may span across multiple wordlines, and the number of FGTs in a string may be equal to the number of pages in a block.

The non-volatile memory die 104 may further include a page buffer or data cache 144 that caches data that is sensed from and/or that is to be programmed to the memory array 142. The non-volatile memory die 104 may also include a row address decoder 146 and a column address decoder 148. The row address decoder 146 may decode a row address and select a particular wordline in the memory array 142 when reading data to or writing data from the memory cells in the memory array 142. The column address decoder 148 may decode a column address to select a particular group of bitlines in the memory array 142 to be electrically coupled to the data cache 144.

In addition, the non-volatile memory die 104 may include peripheral circuitry 150. The peripheral circuitry 150 may include a state machine 152 that provides status information to the controller 102. Other functionality of the state machine 152 is described in further detail below. The peripheral circuitry 150 may also include volatile memory 154. An example configuration of the volatile memory 154 may include latches, although other configurations are possible.

Figure 3:
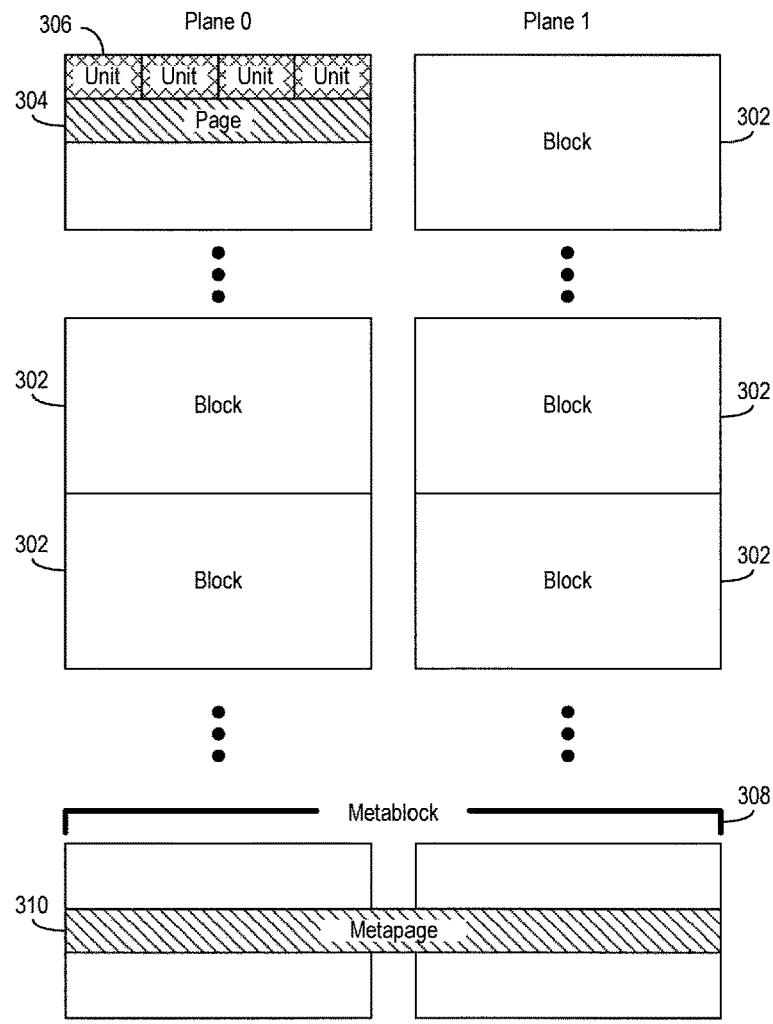
FIG. 3 is a block diagram of an example organizational arrangement or hierarchy of a memory array for flash memory.

Referring to FIG. 3, the memory array 142 and/or a plurality of memory arrays 142 spanning multiple memory dies 104 may have an organizational arrangement or hierarchy under which memory elements or cells of the memory array 142 and/or multiple memory arrays 142 of multiple memory dies 104 may be organized. The controller 102 may be configured to store and access data in accordance with the organizational arrangement or hierarchy.

FIG. 3 is a block diagram of an example organizational arrangement or hierarchy of a memory array 142 for flash memory. As mentioned, for flash memory, the memory cells may be divided or organized into blocks 302, and each block 302 may further be divided into a number of pages 304. Each block 302 may contain the minimum number of memory elements that may be erased together. In addition, each page 304 may be a unit of reading/writing in the memory array 142 (e.g., in the NAND memory). Each individual page 304 may further be divided into segments or units 306, with each segment or unit 306 containing the fewest number of memory cells that may be written to at one time as a basic programming operation. Data stored in a segment or unit of memory cells—herein referred to interchangeably as a data unit, a flash memory unit (FMU), an ECC page, or a codeword—may contain the amount of data that is written at one time during a basic programming operation and/or the amount of data that can be encoded or decoded by the ECC engine 124 during a single encoding or decoding operation. The pages 404 may be divided into the same number of segments or units. Example numbers of segments or units may be four or eight, although other numbers are possible. In general, data may be stored in blocks and pages of memory elements non-contiguously (randomly) or contiguously.

In addition, the organizational arrangement or hierarchy may include one or more planes in which each of the blocks 302 may be configured. Generally, a plane includes a "column" of blocks 302, although other configurations may be possible. A single memory array 142 may include a single plane or multiple planes. The example arrangement shown in FIG. 3 includes two planes, Plane 0 and Plane 1. Data stored in different planes may be sensed simultaneously or independently.

Additionally, the organizational arrangement or hierarchy may include metablocks 308 and metapages 310. A metablock address or number identifying a metablock may be mapped to and/or correspond to a logical address (e.g., a logical group number) provided by a host. A metablock 308 and a metapage 310 may span or be distributed across a respective single block and page in a single plane, or alternatively, may span or be distributed across respective multiple blocks and multiple pages across multiple planes. FIG. 3 shows the metablock 308 and the metapage 310 spanning across two planes, Plane 0 and Plane 1. Depending on the organizational arrangement, metablocks 308 and metapages 310 spanning across multiple planes may span across only those planes of a single memory die 104, or alternatively may span across multiple planes located of multiple memory dies 104.

A host and the non-volatile memory system 100 may use different addressing schemes for managing the storage of data. The host may utilize a host addressing scheme, also referred to as a logical addressing scheme. When a host wants to write data to the non-volatile memory system 100, the host may assign a host address or a logical address (also referred to as a logical block address (LBA)) to the data. Similarly, when the host wants to read data from the non-volatile memory system 100, the host may identify the data it wants read by the logical address. The host may utilize a logical addressing scheme in which a host file system maintains a logical address range for all LBAs assigned or recognized by the host. In addition, for some example configurations, the host may address data in units of logical sectors. Accordingly, host read and write requests may be requests to read and write a segment comprising a string of logical sectors of data with contiguous addresses.

In contrast to the host's logical addressing scheme, the non-volatile memory system 100 may store and access data according to a physical addressing scheme that uses physical addresses different from the logical addresses assigned by the host to store and access data. To coordinate the host's logical addressing scheme with the non-volatile memory system's physical addressing scheme, the non-volatile memory system 100 may perform address translation in which the non-volatile memory system 100 translates a logical address included in a host request to a physical address for storage or retrieval of data. For some example implementations, when the non-volatile memory 100 performs an initial address translation, the physical address that the non-volatile memory system 100 determines may identify a metablock, a plurality of metablocks, and/or physical sectors within a metablock, at which the data is stored.

Figure 4:
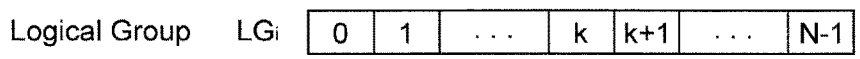
FIG. 4 is a schematic diagram of an example mapping between logical groups and metablocks.
Figure 4:
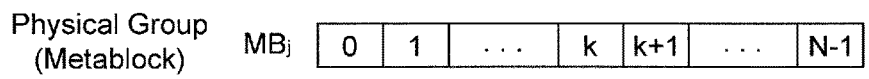
Figure 4:
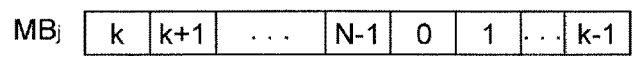

For some example configurations, the logical addresses (LBAs) may be grouped into logical groups (LGs), and the logical groups may be mapped to the metablocks. FIG. 4 shows a schematic diagram of the mapping between logical groups (LG) and metablocks (MB). Each logical group may be mapped to a unique metablock. Accordingly, as shown in FIG. 4, a metablock may have a N-number of physical sectors for storing N-logical sectors of data associated with a logical group. For some example configurations, the logical sectors of data may be stored in the physical sectors in contiguous and sequential logical order 0, 1, ... N−1. Alternatively, N logical sectors of data may be stored randomly or discontiguously in N physical sectors of a metablock.

In addition, for some example configurations where data is stored contiguously, there may be an offset between the lowest address of a logical group and the lowest address of the metablock to which it is mapped. In that case, logical sector addresses may wrap around as a loop from the bottom back to the top of the logical group within the metablock. For example, as shown in the bottom diagram of FIG. 4, a metablock $MB_j$ may store data associated with a logical sector k in its first physical sector 0. When the last logical sector N−1 is reached, the logical sectors may wrap around such that the first logical sector 0 is stored contiguously and sequentially after logical sector 0, and the logical sector k−1 is stored in the last physical sector N−1. A page tag may be used to identify any offset, such as by identifying the starting logical sector address of the data stored in the first physical of the metablock.

Figure 5:
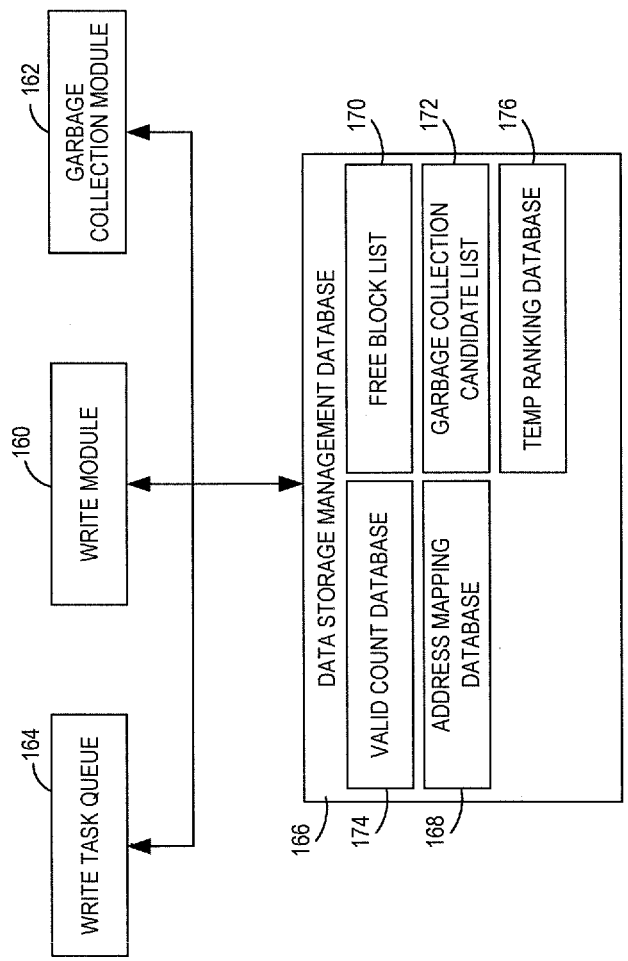
FIG. 5 is a block diagram of write and garbage collection components and a write task queue of the controller of FIG. 2A in communication with a data storage management database.

Referring to FIG. 5, the non-volatile memory system 100 may utilize a data storage management database 166 to manage the storage of data in the non-volatile memory 104. As shown in FIG. 5, the data storage management database 166 may include or be separated into multiple, different portions, including an address mapping database 168, a free block list 170, a garbage collection candidate list 172, a valid count database 174, and a temporary ranking database 176. The data storage management database 104 may be stored in the non-volatile memory 104, the RAM 116, or a combination thereof. For example, some portions of the database 166 may be stored in the non-volatile memory 104 while other portions may be stored in the RAM 116. The portions may be stored in different locations of the non-volatile memory 104 and/or the RAM 116 at the same time or at different times during operation of the non-volatile memory system 104. In addition or alternatively, copies or different versions of the portions may be created and stored, permanently or temporarily, in the non-volatile memory 104 and/or the RAM 116. Various configurations for storing the different portions of the data storage management database 166 may be possible.

The address mapping database 168 may keep track of where in the non-volatile memory system 100 data is stored. The address mapping database 168 may map relationships or associations between host or logical addresses and physical addresses (e.g., metablock addresses). The address mapping database 168 may include one or more address data structures (such as tables, listings, logs, or databases as examples) that track and identify the logical-physical address relationships or mappings that the controller 102 may access to determine where in the non-volatile memory system 100 the most recent version of the data is stored.

The address data structures may include a primary address data structure (also referred to in some configurations as a Group Address Table (GAT)) that provides a primary logical-physical address mapping for logical addresses included in the logical address range recognized by the host. Various configurations of the mapping for the GAT are possible. In one example configuration for flash technology, the GAT keeps track of logical-physical address mapping between logical groups of logical sectors and corresponding metablocks. The GAT includes an entry for each logical group, ordered sequentially according to logical addresses. In addition, the GAT may be organized into a plurality of GAT pages, with each GAT page including entries identifying a metablock address for every logical group. For some example configurations, the address data structures may include at least one secondary address data structure in addition to the GAT. The at least one secondary address data structure may provide logical-physical address mapping for data fragments, may track changes or updates to where data is stored, or some combination thereof. One example secondary address data structure, referred to as GAT Delta, may track changes to entries and/or include a listing of changed entries in the mappings of the GAT. When data is re-written, the new version of the data may be written to another part of the non-volatile memory system 100, such as in an update block. GAT Delta may map data stored in the update blocks with associated logical groups. For some example configurations, GAT Delta may be part of a Master Index Page (MIP) that, in addition to GAT Delta, includes a free block list (FBL) 170 and/or the GAT. As described in further detail below, the free block list may be identify blocks in the non-volatile memory dies 104 that are available for storage of data (e.g., for allocation as an update block) and that may be later mapped to host addresses. Other secondary address data structures may be possible.

Such primary and secondary address data structures are merely exemplary and other data structures may be possible. In general, the non-volatile memory system 100 may maintain at least one address data structure that associates host logical address information with physical address information.

The non-volatile memory system 100 may be configured to perform a write operation to execute a host write command received from the host system. The write command may be a command that instructs the non-volatile memory system 102 to write data associated with the command into the non-volatile memory 104. The host write command may include a host address associated with the data the host system wants written. The host write command may also indicate a size of the data.

When the front end module 108 (FIG. 2A) receives a host write command from the host system, the front end module 108 may be configured to identify the command as a write command (as opposed to another host command such as a host read command) and in response place the write command in the write task queue 164. The write task queue 164 may include a predetermined number of entries, each of which may store a host write command to be executed by the non-volatile memory system 100. An example number of entries may be 32, although other numbers of entries may be possible. In addition or alternatively, the write task queue may be characterized and/or utilized by the modules within the non-volatile memory system 100 in accordance with one or more standards or protocols, such as the JEDEC Solid State Technology Association Embedded Multi-Media Card (eMMC) Electrical Standard.

The write module 160 may be configured to access the write task queue 164 and select the host write commands in the queue 164 for execution. As used herein, a write command in the write task queue 164 that has not yet been selected by the write module 160 for execution may be referred to as a pending write command. Upon selecting a pending write command in the write task queue 164, the write module 164 may identify the size of the data associated with the write command to be written into the non-volatile memory dies 104. The write module 160 may then be configured to check with the free block list 170 to determine whether there is a sufficient amount of available storage space (i.e., a sufficient number of available blocks) to store the data. If so, then the write module 160 may select one or more blocks from the free block list 170 in which to store the data. The write module 160 may then send information identifying the selected blocks to the sequencer module 126, which in turn may generate one or more data transfer context commands to have the data transferred to the non-volatile memory dies 104 and stored in the selected blocks. The sequencer module 126 may send, via the memory interface 130, the data transfer commands along with the data to the non-volatile memory dies 104, which in turn may store the data in the selected blocks.

The garbage collection module 162 may be configured to perform a garbage collection process that makes available blocks in the non-volatile memory dies 104 for storage. As mentioned, garbage collection may be an available storage creation process where valid data units are collected from one or more source storage blocks and moved to one or more destination storage blocks. Since only invalid or obsolete data units remain following the data transfer, the source storage blocks may be erased, and as a result, the one or more source storage blocks may now be available for storage of new, valid data. The portion of garbage collection involving the transfer of the valid data units may be referred to as a compaction process in that the valid data units being stored in the destination storage block(s) are stored more compactly or closer together than they were when stored in the source storage block(s).

The garbage collection module 162 may be configured to perform garbage collection as either a foreground process or a background process. As a foreground process, the garbage collection module 162 may be configured to perform garbage collection in response to there not being sufficient available storage space in the non-volatile memory dies 104 to store data associated with a pending write command. That is, the write module 160 wants to store data associated with a received host write command but cannot because there is not a sufficient amount of available blocks to storage the data. In this situation, the write module 160 may notify the garbage collection module 162 of the need for garbage collection to be performed, such as by providing the garbage collection module 162 with information about the size of the data needing to be stored, and in response, the garbage collection module 162 may perform garbage collection in order to make available one or more blocks for the storage of the data. In addition or alternatively, the garbage collection module 162 may be configured to perform garbage collection as a background process—i.e., not in response to a particular set of data needing to be stored pursuant to a write command. For example, the garbage collection module 162 may be configured to monitor a current storage capacity of the non-volatile memory dies 104. If the current capacity reaches a certain threshold, the garbage collection module 162 may identify this as a triggering event and perform garbage collection in order to make available more blocks in a prophylactic sense.

When the garbage collection module 162 determines to perform garbage collection, the garbage collection module 162 may access the garbage collection candidate list 172 to select one or more source storage blocks and may access the free block list 170 to select one or more destination storage blocks for use in the garbage collection process. In addition to selecting the source and destination storage blocks, the garbage collection module 162 may also be configured to manage the candidate list 172 and the free block list 170. In particular, the garbage collection module 162 may add, subtract, and modify/update the entries in the candidate list 172 and the free block list 170. Modifying or updating the entries may include positioning and/or ranking the blocks in each of the lists 170, 172 relative to each other. Managing a list may also be referred to as sorting the list.

With respect to the free block list 170, blocks in the free block list 170 may be sorted or ranked based on erase count. An erase count of a block may indicate the number of times the block has been erased. The garbage collection module 162 may rank blocks with lower erase counts higher than blocks with higher erase counts. The rationale is that the lower the erase count of a block, the fewer number program/erase cycles that block has experienced, and hence the more desirable that block is as a destination storage block candidate for garbage collection and/or more generally, for a write operation.

The write module 160 and/or the garbage collection module 162 may be configured to continually sort or update the free block list 170 as update events occur, such as write operations, garbage collection, or other events involving the writing and erasing of blocks. As these events occur, the garbage collection module 162 may add blocks, remove blocks, and/or adjust blocks' rankings in the free block list 170.

With respect to the candidate list 172, the garbage collection module 162 may be configured to manage or sort the candidate list 172 based one or more of various criteria. Example criteria include an activity level, a validity count, and a health. An activity level of a block may correspond to a frequency of access—i.e., a number of times that the block has been accessed by the controller 102 for performance of an operation, such as a read or a write operation. In addition or alternatively, the activity level of a block may correspond to a recentness of access—i.e., how long ago the block was last accessed by the controller 102 for performance of an operation.

In some example configurations, the garbage collection module 162 may determine to include a block in the candidate list 172 based on whether an activity level of the block exceeds a threshold activity level—i.e., whether the number of times the block has been accessed, accessed within a certain time period, or a combination thereof, has exceeded a threshold. If it has, then the garbage collection module 162 may determine to include the block in the candidate list 172.

In addition or alternatively, the garbage collection module 162 may organize or partition the candidate list 172 into pools or sub-lists, including an active block pool and an inactive block pool. The garbage collection module 162 may determine to include a block in the active block pool if the block's activity level has exceeded the activity threshold. If not, then the block may be included in the inactive block pool. For configurations where the candidate list 172 is partitioned into two different pools, the garbage collection module 162 may assign or attribute higher priority to the blocks in the active block pool compared to the blocks in the inactive block pool when selecting blocks on which to perform garbage collection. If there are no more blocks in the active block pool, then the garbage collection module 162 may select a block in the inactive block pool. In other example configurations, the garbage collection module 162 may not consider blocks in the active block pool for garbage collection, even if no blocks are listed in the active block pool. In this sense, the candidate list 172 may be considered to include the active block pool but not the inactive block pool.

Additionally, the blocks in the candidate list 172 and/or a particular active/inactive block pool within the candidate list 172 may be ranked or positioned relative to each other based on one or more criteria, including validity count and/or health. The validity count associated with a block may identify a number of valid data units in the block. A health of a block may correspond to the block's ability to reliably retain data at correct levels (e.g., voltage levels). The health of a block may be quantified by a number of program-erase (PE) cycles the block has undergone. A PE cycle for a block may occur each time a block is programmed (i.e., written to) and subsequently erased. The number of PE cycles a block has undergone may be inversely proportional to the block's health—the more PE cycles the block has undergone the less healthy or less reliable the block may be in retaining data at its correct level.

With regard to the validity count, the garbage collection module 162 may rank blocks with lower validity counts higher than blocks with higher validity counts. The rationale is that the lower the validity count, the greater the number of invalid data units that the block is storing, and hence the more desirable that block is as a candidate for garbage collection.

In some example configurations, the garbage collection module 162 may rank blocks in the candidate list 172 based on validity count alone. In other example configurations, the garbage collection module 162 may rank the blocks based on both validity count and health. In one example for these other configurations that consider both, the garbage collection module 162 may initially rank the blocks in the candidate list 172 by sorting them into validity bins, with each validity bin corresponding to a different validity count or range of validity counts. The distribution of the blocks in the validity bins may be generated according to a histogram analysis, as an example. Then, within each validity bin, the blocks may be ranked a second time according to health (e.g., PE cycle).

For candidate list configurations that includes both an active block pool and an inactive block pool, blocks in the active block pool may be ranked by either validity count alone or a combination of validity count and health as described above, whereas blocks in the inactive block pool may be ranked by health alone. Various way of sorting or ranking blocks in the candidate list 172 based on activity level, validity count, and health may be possible.

The garbage collection module 162 may be configured to continually sort or update the garbage collection candidate list 172 as update events that cause the garbage collection module 162 to update the candidate list 172 occur, such as access events during which the controller 102 accesses the non-volatile memory dies 104 to perform read or write operations or expiration of time periods that affect block activity levels, write operations that affect validity counts of the blocks, and/or PE cycles counts for the blocks. As these events occur, the garbage collection module 162 may add blocks, remove blocks, move blocks between the active and inactive block portions, and/or adjust blocks' rankings in the candidate list 172.

When the garbage collection module 162 determines to perform garbage collection, the garbage collection module 162 may select one or more blocks from the candidate list 172 for source storage blocks and one or more blocks from the free block list 170 for destination storage blocks. Which source and destination storage blocks the garbage collection module 162 selects may be based on the rankings of the blocks in the free block and candidate lists 170, 172. Blocks with higher rankings may be selected for garbage collection over blocks with lower rankings.

In addition to selecting the source block(s) and the destination block(s), the garbage collection module 162 may identify the valid data units that are being stored in the source block(s) that are to be moved. The garbage collection module 162 may do so by accessing the address mapping database 168. For example, the garbage collection module 162 may determine a set or range of physical addresses for the selected source block(s) and using the physical addresses, identify the data being stored there as indicated in the address mapping database 168. This, in turn, may indicate the valid data units and the invalid data units in each of the selected source block(s). The garbage collection module 162 may then provide those particular physical addresses identifying where in the source block(s) the valid data units are being stored to the sequencer module 126, along with the destination block information. In response, the sequencer module 126 may generate and send data transfer context commands to the memory die(s) 104 via the memory interface 130 to write the valid data units into the destination block(s). Subsequently, an erase operation may be performed on the source storage blocks, after which the source storage blocks may be available to store new, valid data. After the valid data sets are copied to the destination block(s) and the source block(s) are erased, the non-volatile memory die(s) 104 may notify the garbage collection module 162 that garbage collection has been completed.

If the garbage collection module 162 is performing garbage collection as a foreground process, the garbage collection module 162 may then notify the write module 160 of the completion and that the write module 160 can proceed with executing the write operation for the write command. In some example configurations, the garbage collection module 162 may directly inform the write module 160 of the blocks that are now available as a result of garbage collection. In other example configurations, the garbage collection module 162 may add the available source blocks to the free block list 170 after garbage collection is performed, and the write module 160 may then access the free block list 170 to identify the available blocks. Various configurations for enabling the write module 160 to proceed with performing a write operation following garbage collection may be possible. Alternatively, if the garbage collection module 162 is performing garbage collection as a background process, the garbage collection module 162 may merely update the free block list 170 when garbage collection is completed.

The garbage collection module 162 may be configured to utilize the write task queue 164 and/or write commands in order to generally improve garbage collection efficiency and in particular to reduce write amplification. Write amplification may refer and/or correspond to the number of times the memory interface 130 is accessed or used to communicate data to the non-volatile memory dies 104 per data unit. The more times the memory interface 130 is accessed may correspond to the number of times data is written to and moved within the memory dies 104, which as mentioned above factors into the deterioration of the health of the memory dies 104.

In the context of garbage collection, write amplification may be improved by performing actions that reduces the number of occurrences of double write operations, the first being performed for garbage collection and the second being performed for execution of a write command. To illustrate, suppose a write command is received and due to an insufficient amount of storage space, the garbage collection module 162 performs garbage collection in order to make available a block to store data associated with the write command. Further, suppose that a current version of at least some of the associated data is already being stored in a particular block, e.g., Block A, in the memory dies 104, and that particular Block A happens to be highly ranked in the candidate list 172 (e.g., because it has a low number of valid data units or a high number of invalid data units). Consequently, the garbage collection module 162 selects Block A for garbage collection and moves valid data units associated with the write command from Block A to a different storage area (e.g., a different block identified in the free block list 170). After the valid data associated with the write command are moved from Block A to the different storage area, the garbage collection module 162 may erase Block A, which may be done immediately or at a later time. Hence, a first write of valid data units is performed in order to execute the write command. Subsequently, the write module 160 proceeds to actually execute the write command, which involves storing a new current version of the data units back into Block A (i.e., the block that was freed as a result of garbage collection). Hence, a second write of valid data units is performed in order to execute the write command.

For a given data set associated with a host address to be stored pursuant to a write command, if only one write instead of two can be performed in order to execute the write command, write amplification may be reduced and overall efficiency of performing write operations may be improved. In the context of garbage collection, the non-volatile memory system 100 of the present description may improve write efficiency and/or write amplification by utilizing the write task queue 164 and/or write commands selected from the write task queue 164, and in particular by: (1) discouraging the garbage collection module 162 from selecting source blocks for garbage collection that are storing valid data sets associated with pending write commands in the write task queue 164; and/or (2) for a selected write command, encouraging the garbage collection module 162 to select, for garbage collection, block(s) that are storing at least some of the valid or current data units associated with the selected write command.

The garbage collection module 162 may discourage itself from selecting those source blocks for garbage collection that are storing valid data sets associated with pending write commands in the write task queue 164 by updating the candidate list 172 such that other blocks in the candidate list 172 with lower actual ranking are selected over those blocks. The garbage collection module 162 may do so in various ways and/or performing one or a combination of various types of discouraging actions. In one type of discouraging action, the garbage collection module 162 may artificially assign relatively low rankings for those blocks storing valid data units associated with pending write commands in the write task queue 164. For example, the rankings may be artificially lowered from an actual ranking to a minimum ranking or an artificially lower ranking determined by weighting the validity counts associated with those blocks, such as by multiplying the validity counts by a predetermined number in order to artificially increase the validity counts, thus decreasing the associated rankings. In another type of discouraging action, the garbage collection module 162 may remove from the candidate list 172 blocks storing valid data units associated with pending write commands in the write task queue 174. In a third type of discouraging action, the garbage collection module 162 may append a "do not select" tag to the block(s) storing the valid data units associated with the pending write commands. This flag may cause the garbage collection module 162 to avoid selecting the block(s) for garbage collection. Alternatively to appending a "do not select" tag, the garbage collection module 162 may maintain a "do not select" list that includes blocks to avoid selecting. If the garbage collection modules 162 wants to select a block, then before actually selecting the block, the garbage collection module 162 may check the "do not select" list to determine if the block is included in the "do not select" list. If it is, then the garbage collection module 162 may avoid selecting the block, and instead choose a different one.

The garbage collection module 162 may determine to analyze the write task queue 164 to determine whether to perform one or more discouraging actions in response to one or more of various triggering events. In one example, the garbage collection module 162 may be configured to analyze the write task queue 164 upon expiration of a time period or periods occurring at periodic time intervals. In addition or alternatively, the garbage collection module 162 may determine to analyze the write task queue 164 in response to occurrence of an update event indicative of a possible update to the candidate list 172, such as an access event associated with a read or write operation or expiration of time periods that affect block activity levels, write operations that affect validity counts of the blocks, and/or PE cycles for the blocks. When being prompted to update the candidate list 172 in response to the update event, the garbage collection module 164 may also be prompted to check the write task queue 164 to see if there are any new write commands for the garbage collection module 162 to consider when updating the candidate list 172. Other triggering events to cause the garbage collection module 162 to analyze the write task queue 164 for purposes of managing block selection for garbage collection may be possible.

In addition or alternatively, the garbage collection module 162 may receive notice from another module in the non-volatile memory system 100, such as from the front end module 108 or the write module 160, that a new write command has been placed in the write task queue 108. In response to the notification, the garbage collection module 162 may access the write task queue 164 and identify the host address information associated with the new write command. Alternatively, the notification itself includes the host address information, which the garbage collection module 162 can then use to determine whether to update the candidate list 172.

In addition or alternatively, the garbage collection module 162 may determine to analyze the write task queue 164 to determine whether to perform a discouraging action in response to a selection of a write command by the write module 160 and a subsequent determination by the write module 160 that garbage collection is needed in order to execute the write command. In a particular configuration, the determination to analyze the write task queue 164 to determine whether to perform a discouraging action may further be in response to a determination that a size of the data being requested to be written by the selected write command is below a size threshold and/or a spread of corresponding valid data being stored in the memory dies 104 is above a spread threshold. Further details of the size and spread determinations is described below.

In some example configurations, the determination of whether to perform a discouraging action may depend on a total size of the data requesting to be written by one or more write commands that are currently pending in the write task queue 164. For example, when the garbage collection module 162 identifies a triggering event and in response determines to analyze the write task queue 164, the garbage collection module 162 may first determine whether a total size of the data that a predetermined number of pending write commands in the write task queue 164 are requesting to be written exceeds a threshold size. If so, then the garbage collection module 162 may determine whether to perform one or more discouraging actions in association with the write commands identified in the write task queue 164. The predetermined number of pending write commands may be a fixed number or may be the total number of write commands pending in the write task queue 164 at any given time. In some example configurations where the triggering event is garbage collection needing to be performed in order to execute a selected write command, the garbage collection module 162 may or may not consider the selected write command when determining the total data size.

In addition, when analyzing a write command in the write task queue 164 to determine whether to perform a discouraging action, the garbage collection module 162 may identify host address information associated with the write command. The host address information may identify, from the host's perspective, where the host wants the data associated with the write command written. The garbage collection module 162 may then use the host address information to perform a lookup in the address mapping database 168. If a current version of at least a portion of the data is already being stored in the memory die(s) 104, the lookup may identify the physical addresses, including the block(s) in the memory die(s) 104, where the current version of data is being stored. If the lookup returned block information identifying one or more blocks where the current version of the data is being stored, the garbage collection module 162 may then access the candidate list 172, and using the block information, identify whether any blocks identified in the candidate list 172 match the blocks identified from the lookup in the address mapping database 168. If so, then the garbage collection module 162 may perform one of the discouraging actions described above to discourage itself from selecting the block for garbage collection.

The effect of the discouragement actions is that the garbage collection avoids or at least increases the likelihood that it avoids selecting a block for garbage collection that it might otherwise select due to the block's actual ranking in the candidate list 172. By doing this, initial, unnecessary transfer of data units performed for garbage collection before new versions of those data units are written to execute host write commands may be avoided. This, in turn, may improve performance in write operations and garbage collection since the write module 160 may not have to wait for a garbage collection process to be performed before executing a write command in the write task queue 164. In addition, write amplification with respect to write commands included in the write task queue 164 may be reduced since, by avoiding unnecessary garbage collection, the number of transactions (e.g., context command communications)

that are communicated between the controller 102 and the non-volatile memory dies 104 in order to execute the write commands may be reduced.

The garbage collection module 162 may further be configured to stop discouraging selection of a block and/or effectively undo or reverse a discouraging action with respect to a block after a corresponding write command is no longer pending in the write task queue 164. For example, if the garbage collection module 162 set a ranking of a block to an artificially low value, the garbage collection module 172 may be configured to set the ranking back to its actual value after the corresponding write command is selected for execution. In addition or alternatively, if the garbage collection module 162 removed a block from the candidate list 172, the garbage collection module 162 may be configured to re-add the block back to the candidate list 172 after the corresponding write command is selected for execution. In addition or alternatively, if the garbage collection module 162 appended a "do not select" tag to a block in the candidate list, the garbage collection module 162 may be configured to remove the "do not select" tag from the block. Likewise, if the garbage collection module 162 included a block in a "do not select" list, then the garbage collection module 162 may remove the block from the "do not select" list after the write command is selected for execution.

During the time period that a corresponding write command is pending, the garbage collection module 162 may be configured to maintain a block and/or information about the block in a temporary block information database 176, which the garbage collection module 162 may then access in order to update the candidate list 172 after the corresponding write command is selected for execution. For configurations where the garbage collection module 162 set rankings to artificially low levels, the garbage collection module 162 may be configured to maintain and keep track of the actual rankings of the blocks in the temporary block information database 176 while the corresponding write command is pending in the write task queue 164. If any update events occur that would cause the actual ranking to change, the garbage collection module 162 may update the actual ranking in the temporary block information database 176 accordingly. After the corresponding write command is executed and removed from the write task queue 164, the garbage collection module 162 may then set the ranking for that block in the candidate list 172 to the actual ranking identified in the temporary block information database 176. The garbage collection module 162 may then remove the block and actual ranking from the temporary block information database 176.

In a similar fashion for configurations where the garbage collection module 162 removes blocks from the candidate list, the garbage collection module 162 may add the removed blocks and their associated rankings to the temporary block information database 176. The garbage collection module 162 may monitor and update the rankings as appropriate in the temporary block information database 176. After the corresponding write command is selected for execution, the garbage collection module 162 may add the block and its associated ranking back to the candidate list correspondingly remove the block and its associated ranking from the temporary block information database 176.

Likewise, for configurations where the garbage collection module 162 implements a "do not select" list, the garbage collection module 162 may maintain the list in the temporary ranking database 176. If the garbage collection module 162 adds a block to the list after identifying a corresponding write command in the write task queue 164, the garbage collection module 162 may remove the block after the corresponding write command is selected for execution.

After the corresponding write command is selected, the garbage collection module 162 may determine whether the block should indeed be added back to candidate list 172. For example, suppose during the time that the corresponding write command is pending that the ranking for a block decreases below a threshold (e.g., its validity count reaches a level above a threshold causing it to no longer be considered a desirable candidate for garbage collection), when the corresponding write command is selected for execution, the garbage collection module 162 may decide to remove the block from the candidate list 172 after its actual ranking is restored or not re-add the block to the candidate list 172 if the block was initially removed and added to the temporary block information database 176.

As mentioned, in addition or alternatively to the garbage collection module 162 discouraging itself from selecting source blocks for garbage collection that are storing valid data sets associated with pending write commands in the write task queue 164, the garbage collection module 162, for a selected write command, may encourage itself to select for garbage collection block(s) that are storing at least some of the valid or current data units associated with the selected write command.

In further detail, in some situations during the course of operation of the memory system 100, the write module 160 may select a write command in the write task queue 164 for execution. In determining where in the non-volatile memory dies 104 to store the data that the write command is requesting to have stored, the write module 160 may determine, such as by analyzing the free block list 170, that there is not a sufficient amount of available storage space in memory dies 104. In response, the write module 160 may notify the garbage collection module 162 to perform garbage collection to make available space in the memory dies 104 so that the write command may be executed.

In response to the notification, the garbage collection module 162 may access the write task queue 164 or otherwise obtain host address information associated with the write command, just as by receiving it directly from the write module 160. The garbage collection module 162 may then, using the host address information, perform a lookup in the address mapping database 168 to determine if there are any valid data units already being stored in the memory dies 104, and if so, which block(s) of the memory dies 104 are storing the valid data units.

Assuming that the garbage collection module 162 is storing current versions of at least some data units of the data and identifies one or more blocks storing the current versions, the garbage collection module 162 may select at least one of those blocks on which to perform garbage collection. As mentioned, when performing garbage collection, the garbage collection module 162 may communicate with the non-volatile memory dies 104 to have valid data units transferred to a destination storage area. For this example garbage collection implementation, the garbage collection module 162 may move only those valid data units that are not associated with the data being requested to be written by the selected write command. So, if the garbage collection module 162 selects one or more of those identified blocks on which to perform garbage collection, the garbage collection module 162 may determine, of the valid data units in the block(s), which of the valid data units are associated with the write command and which are unassociated with the write command. The garbage collection module 162 may do so by performing a lookup in the address mapping database 168 and determining which valid data units are associated with the host address information identified by the write command and which valid data units are not associated with the host address information.

Upon determining which valid data units are and are not associated with the host address information, the garbage collection module 162 may identify a destination storage area (i.e., one or more blocks) in the memory dies 104 and then have moved the unassociated valid data units but not the associated valid data units to the destination storage area. The garbage collection module 162 may do so by sending physical address information associated with the unassociated valid data units to the sequencer module 126, which in turn may generate one or more data transfer context commands and send the data transfer context commands to the memory die(s) 104 via the memory interface 130 to have the unassociated valid data units moved to the destination storage area.

Once the unassociated valid data units but not the associated valid data units are moved to the destination storage area, the garbage collection module 162 may erase the source blocks and then notify the write module 160 that garbage collection is complete. In response, the write module 160 may, using the sequencer module 126 and the memory interface 130, have the data associated with the write command written to the block(s) on which garbage collection was just performed. In doing so, the data may essentially overwrite or replace the valid data units that were not transferred during garbage collection. As a result, write amplification may be reduced since, by excluding at least some data units associated with the write command from the garbage collection process, fewer transactions (e.g., fewer data transfer context command communications) may be performed in order to perform garbage collection and then execute the write command.

In some example configurations, if the garbage collection module 162 identifies one or more blocks storing valid units associated with a write command that has been selected for execution, the garbage collection module 162 may arbitrarily choose all or some of those identified block(s). For example, suppose a Write Command X is selected from the write task queue 164, and the garbage collection module 162 determines that valid data units associated with Write Command X are being stored in four blocks, e.g., Block A, Block B, Block C, and Block D. Suppose for example that only two blocks are needed to execute Write Command X (i.e., store the data identified by Write Command X into the memory dies 104). In some example configurations, the garbage collection module may select two of the four blocks arbitrarily for garbage collection.

In other example configurations, the garbage collection module 162 may select the block(s) based on which blocks have among the lowest unassociated validity count. As used herein, an unassociated validity count of a block may be the number of valid data units that are unassociated with a write command selected for execution. So, using the above example, suppose the garbage collection module 162 determines that Block A and Block C are the two of the four blocks having the lowest unassociated validity count. The garbage collection module 162 may then select Block A and Block C for garbage collection. After garbage collection is performed, the write module 160 may execute Write Command X by having the data written to Block A and Block C.

In order to determine which block(s) has/have the lowest unassociated validity count for a selected write command, the garbage collection module 162 may determine the number(s) of valid data units unassociated with the write command for each of the block(s). In some example configurations, the garbage collection module 162 may be configured to determine the number of valid data units unassociated with a write command in a block by simply counting the number of unassociated valid data units. In other example configurations, total numbers of valid data units (otherwise referred to as a total validity count) for the blocks may be tracked and/or managed in the memory system 100, and the garbage collection module 162 may determine the numbers of unassociated valid data units of the block(s) based on the total validity counts.

With respect to a write command that is selected and/or is to be selected for execution, a total validity count may be the sum of the number of valid data units associated with the selected write command being stored in a block and the number of valid data units unassociated with the selected write command being stored in the block. For some example configurations, the total validity counts may be stored in the memory dies 104, such as each total validity count may be stored in its associated block. In addition or alternatively, the total validity counts may be maintained and managed collectively, such as in a validity count database 174. For a given block, the garbage collection module 162 may determine the unassociated validity count by subtracting the number of associated valid data units from the total validity count.

In some example configurations, the garbage collection module 162 may consider the identified block(s) in isolation. In other example configurations, the garbage collection module 162 may weigh the maximum unassociated validity counts against those of other blocks, namely those of blocks identified in the candidate list 172. Using the example above, suppose again that Blocks A and C are selected as having the two lowest unassociated validity counts among blocks A, B, C, and D. Candidate list rankings corresponding to their respective unassociated validity counts may be assigned to Blocks A and C. These rankings may be compared to the rankings of other blocks in the candidate list 172 and selected for garbage collection if their rankings are better than those blocks already in the candidate list.

As an illustration, suppose for example that Blocks E, F, G, and H are among the highest ranked blocks in the candidate list 172. Two of these blocks, such as Blocks E and F for example, would be selected for garbage collection if Blocks A, B, C, D, particularly Blocks A and C, are not considered. Further suppose that after the garbage collection module 162 assigns rankings to Blocks A and C, Block A is higher than the rankings of any of Blocks E through H, while Block C's ranking is in between Block G and Block H. As such, the garbage collection module may select the two highest-ranked blocks—in this example Blocks A and E—for garbage collection. During garbage collection, the valid data units unassociated with Write Command X are moved to a destination storage area, but not the valid data units associated with Write Command X. Also, since Block E was not identified as storing valid data units associated with Block E, then all of the valid data units it is storing may be moved to the destination storage area. After garbage collection is performed, the write module 160 may execute Write Command X by writing the data to Blocks A and E.

In other example configurations, the garbage collection module 162 may consider blocks identified in the candidate list only if additional blocks are needed to be selected as source blocks for garbage collection. Using the above example to illustrate, suppose the size of the data that Write Command X is requesting to be written requires six blocks to be made available through garbage collection. After the garbage collection module 162 determines that valid data units associated with Write Command X are being stored in four blocks—Blocks A, B, C, and D, the garbage collection module 162 may determine that it needs two more blocks for source blocks. The garbage collection module 162 may then access the candidate list 172 and select the blocks with the highest rankings, e.g., Blocks E and F. Alternatively, if only four blocks or less are needed as source blocks for garbage collection, then the garbage collection module 162 may consider only Blocks A, B, C, and D to select the blocks.

If a block that is selected for garbage collection is already in the candidate list, then its ranking may be adjusted corresponding to its unassociated validity count. If its unassociated validity count is lower than its total validity count—which will likely be the case—then its ranking may be correspondingly increased. The garbage collection module 162 may then update the candidate list in accordance with the update/sorting actions described above.

In some example configurations, whether the garbage collection module 162 selects blocks for garbage collection based on unassociated validity counts may depend on the size of the data that a selected block is requesting to be written and/or a spread of the current version of the data already being stored in the memory dies 104. If the size of the data that is requesting to be written is relatively small, the reduction in write amplification and/or overall write efficiency may not be significantly realized such that it might not be worth having the garbage collection module 162 analyze the unassociated validity counts of identified blocks. In addition or alternatively, the garbage collection module 162 may also consider the spread of the corresponding valid data being stored in the blocks across the memory dies 104. The spread of data may be indicative as to how contained or together a given data set is being stored. In some examples, the spread may be measured in terms of the size of the data set and the number of blocks that are storing the data set. As an example, suppose a data set has a size of one block. That data set being stored in a single block has a smaller spread compared to if that data set is stored across multiple blocks. The more blocks that are storing the data set, the larger the spread. If the garbage collection module 162 determines that the spread of corresponding valid data is too large, then the garbage collection module 162 may forego determining whether to perform garbage collection on blocks based on unassociated validity counts.

When a write command is selected and the write module 160 determines that garbage collection is to be performed in order to execute the write command, the garbage collection module 162 may determine the size of the data requesting to be written and/or may determine the spread of corresponding valid data being stored in the memory dies 104. If the data size is below a size threshold, then the garbage collection module 162 may forego selecting blocks for garbage collection based on unassociated validity counts. In some example configurations, a size associated with a host address space (e.g. a logical group) may be different than a size of a physical block in the non-volatile memory dies 104. For example, a size of a logical group may be in the order of bytes (e.g., 512 bytes) whereas a size of a block may be in the order of megabytes. In some examples, the size threshold may be determined or expressed in the number of bytes, which may correspond to the size of a physical block rather than a logical group size. In other examples, the size threshold may be and/or correspond a physical feature of the memory dies 104, such as a number of pages or blocks.

In addition or alternatively, if the garbage collection module 162 determines that the spread of corresponding valid data being stored in the memory dies 104 is above a spread threshold, then the garbage collection module 162 may forego selecting blocks for garbage collection based on unassociated validity counts.

In some example configurations, if the garbage collection module 162 determines that the data size is below the size threshold and/or is above the spread threshold, the garbage collection module may still determine to analyze the write task queue 164 to determine whether to perform any discouraging actions as described above. For example, if the garbage collection module 162 determines that the data size is below the size threshold and/or is above the spread threshold, the write task queue 164 may determine whether a total data size of pending write commands in the write task queue 164, including or excluding the size of the selected write command, is above a size threshold. If so, then the garbage collection module 162 may determine whether to perform any discouraging actions for any blocks identified in candidate list, as previously described.

Figure 6:
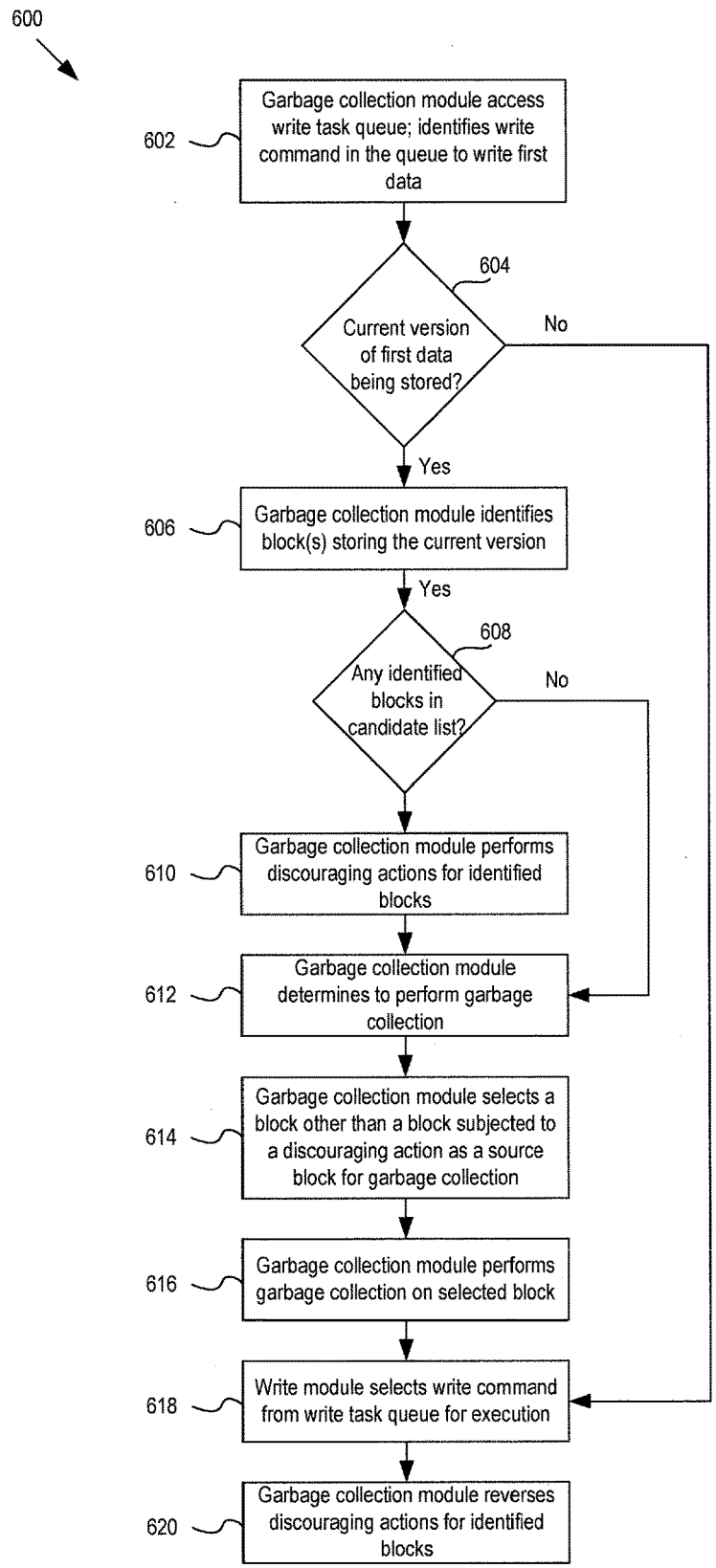
FIG. 6 is a flow chart of an example method of managing a garbage collection process based on write commands in a write task queue.

FIG. 6 shows a flow chart of an example method 600 of managing a garbage collection process based on write commands in a write task queue. At block 602, a garbage collection module of a non-volatile memory system may access the write task queue. The garbage collection module may do so in response to a triggering event, such as expiration of a time period (e.g., an end of one of a plurality of periodic time intervals), an update event indicative of a possible update to a garbage collection candidate list, or a queuing of a new write command in the write task queue. Upon accessing the write task queue, the garbage collection module may identify a write command in the write task queue requesting to write first data into non-volatile memory of the non-volatile memory system.

At block 604, the garbage collection module may determine whether a current version of at least some of the first data is already being stored in the non-volatile memory. The garbage collection module may do so by accessing an address data structure that maintains mappings of host address information to physical address information. If so, then at block 606 the garbage collection module may identify the block(s) in the non-volatile memory that are storing the current version of the first data and associate those identified blocks with the write command.

At block 608, the garbage collection module may access a garbage collection candidate list for selecting source storage blocks for garbage collection and determine whether any blocks identified as being associated with the write command at block 606 are in the candidate list. In some example methods, the garbage collection module may analyze an active block pool but not an inactive block pool of the candidate list to make the determination at block 608.

If there are, then at block 610, the garbage collection module may perform one or more discouraging actions that discourage the garbage collection module from selecting the blocks in the candidate list that are also storing current versions of the first data to be source storage blocks for garbage collection. As previously described, the discouraging actions may include lowering rankings of the blocks to lower levels, removing the blocks from the candidate list, appending a "do not select" tag to the blocks in the candidate list, and/or adding the blocks to a "do not select" list, as non-limiting examples.

At block 612, the garbage collection module may determine to perform garbage collection, which may be either as a foreground or a background process. Referring back to block 608, if the garbage collection module determines that none of the blocks identified as storing a current version of the first data are also in the candidate list, then no discouraging actions are performed for those blocks storing the current version of the first data and the method may proceed directly to block 612.

At block 614, in response to the determination to perform garbage collection, the garbage collection module may access the candidate list and select a block to be a source storage block for the garbage collection. The garbage collection module may select a block that is not subjected to a discouraging action (i.e., a block other than one that is being subjected to a discouraging action). Due to the discouraging action(s), the block that is selected at block 614 may have an actual ranking that is lower than an actual ranking of the blocks subjected to the discouraging actions. However, because those blocks are being subjected to the discouraging actions, the garbage collection module may select the block not subjected to the discouraging action instead.

At block 616, the garbage collection module may communicate with the non-volatile memory to perform garbage collection on the selected block. In doing so, valid data stored in the selected block may be transferred to a destination block, which the garbage collection module may select from a free block list. The selected block may then be erased, either immediately after the transfer or at a later time.

At block 618, a write module may select the write command from the write task queue for execution of the write command. The write module may communicate with the non-volatile memory to write at least some of the first data to the selected block on which the garbage collection process was performed in order to execute the write command. Referring back to block 604, if the garbage collection module does not identify a current version of the first data already being stored (i.e., the first data requesting to be written is new—a version has not been previously written to the non-volatile memory), then the method may proceed directly to block 618, where the write module selects the write command for execution. At block 620, after executing the write command, the garbage collection module may undo or reverse any discouraging actions performed for the blocks at block 610, as previously described.

Figure 7:
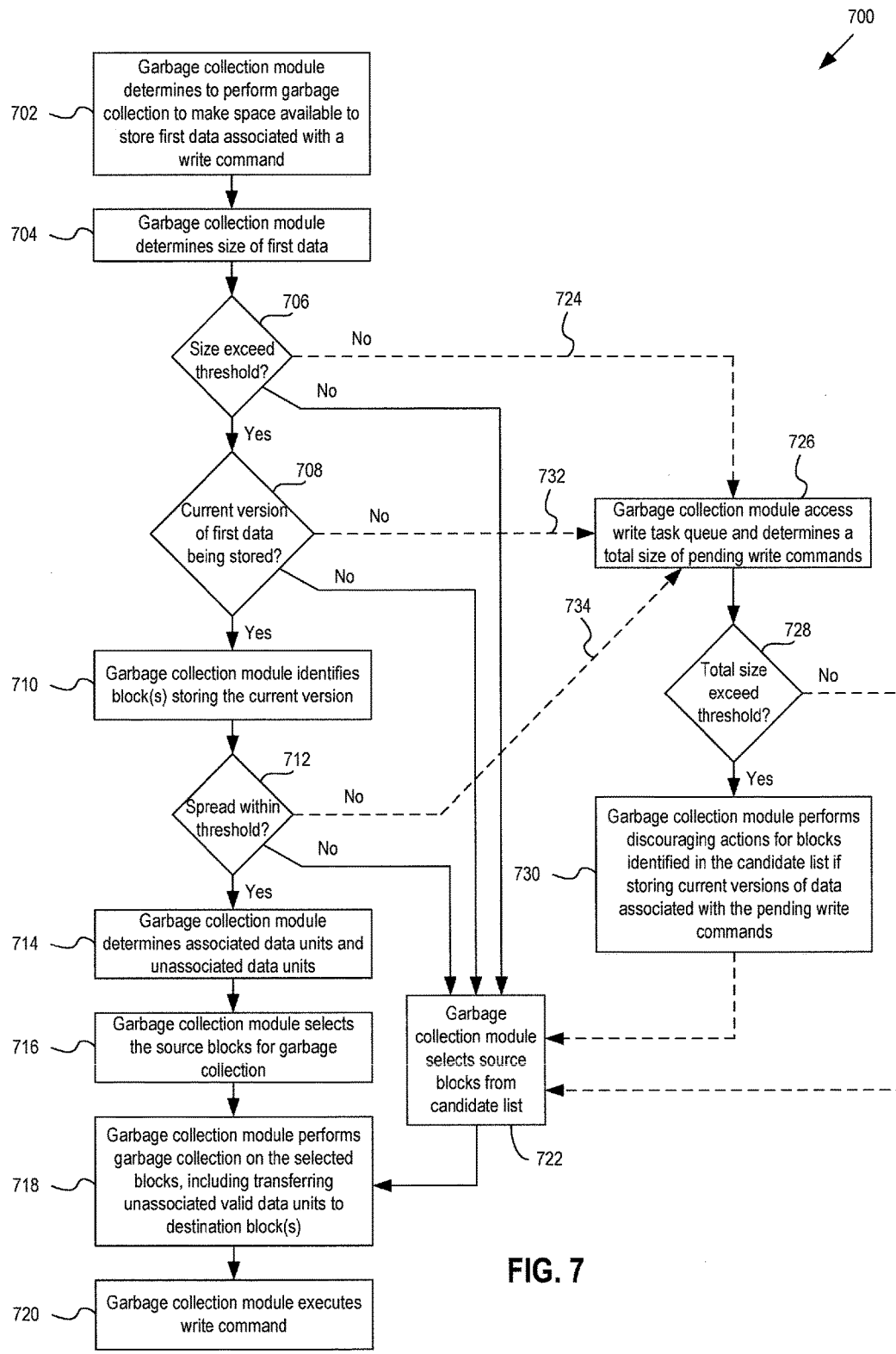
FIG. 7 is a flow chart of another example method of managing a garbage collection process based on write commands in a write task queue.

FIG. 7 shows a flow chart of another example method 700 of managing a garbage collection process based on write commands in a write task queue. At block 702, a garbage collection module may determine to perform garbage collection to make space available for a write module to execute a write command to write data to non-volatile memory. The write command may be pending in the write task queue. In some example methods, the write module may notify the garbage collection module to perform garbage collection in order to make enough space available to execute the write command.

At block 704, the garbage collection module may determine the size of the data requested to be written. From the determination, the garbage collection module may determine how many data blocks are needed for execution of the write command and/or how source blocks to select for garbage collection. At block 706, the garbage collection module may determine if the size of the data exceeds a size threshold. If it does exceed the size threshold, then at block 708, the garbage collection module may determine whether a current (valid) version of at least some of the data is being stored in the non-volatile memory. The garbage collection module may do so by obtaining the host address information of the data and then performing a lookup in an address database, as previously described.

At block 710, if a current version of at least some of the data is being stored in the non-volatile memory, then the garbage collection module may identify the block(s) that are storing the current versions. At block 712, the garbage collection module may determine whether a spread of the current version of the data is less than a spread threshold. If the spread is less than the spread threshold, then at block 714, the garbage collection module may determine, of the blocks identified at block 710, the valid data units that are associated with the write command (i.e., that are part of the current version of the data) and that are unassociated with the write command (i.e., that are not part of the current version of the data).

At block 716, the garbage collection module may select the source blocks for garbage collection based on consideration of the associated and unassociated valid data units determined at block 714. To make the selection, the garbage collection module may consider the number of blocks needed as source blocks for garbage collection in order to execute the write command, unassociated validity counts of the blocks identified at block 710, unassociated validity counts of blocks identified in a garbage collection candidate list that may not have been identified at block 710, or some combination thereof. In some example methods, the garbage collection module may first consider for selection the blocks identified at block 710. The garbage collection module may then select blocks from the candidate list only if additional source blocks are needed for garbage collection. For these methods, if the number of blocks identified at block 710 is greater than the number of blocks that the garbage collection module needs to select for garbage collection, then the garbage collection module may either select the needed number of blocks from the blocks identified at block 710 arbitrarily or may select, among the blocks identified at block 710, the blocks with the lowest unassociated validity counts. For other example methods, the garbage collection module may consider the blocks identified at block 710 and the blocks in the candidate list together or collectively. From the collection of blocks, the garbage collection module may select the blocks with the lowest unassociated validity counts. If the garbage collection module needs to determine any unassociated validity counts for the blocks in order to make the selection, then the garbage collection module may do so at block 716 if it has not done so already.

At block 718, the garbage collection module may perform garbage collection on the selected blocks by communicating with the non-volatile memory to transfer unassociated valid data units from the selected source blocks to destination block(s). Any associated valid data units of the selected blocks may not be part of the transfer to the destination block(s). After transferring the unassociated valid data units, the garbage collection module may then erase the selected blocks.

In some example methods, the garbage collection module may select source blocks at block 716 and perform garbage collection at block 718 over multiple iterations. As an example, the garbage collection module may select as source blocks those blocks identified at block 710 and perform garbage collection on those blocks. Subsequently, the garbage collection module may determine if it needs to perform further garbage collection processes to make additional storage space available for execution of the write command. If so, then the garbage collection module may access the candidate list, select blocks from the candidate list, and perform garbage collection until a sufficient amount of storage space is available.

At block 720, when a sufficient amount of storage space is available, the write module may execute the write command by writing the data to the source blocks of the garbage collection.

Referring back to block 706, if the size of the data does not exceed the size threshold, then the garbage collection module may forego analyzing associated and unassociated valid data units to select source blocks and perform garbage collection, and the method may proceed to block 722, where the garbage collection module may select the source blocks for garbage collection from the candidate list without consideration of associated and unassociated valid data units of blocks storing current versions of the data. The garbage collection process may select the blocks according to a ranking scheme as previously described. After selecting the source blocks from the candidate list at block 722, the method may then proceed to block 718, where the garbage collection module performs garbage collection on the selected source blocks.

Similarly, referring back to block 708, if the non-volatile memory is not storing any current versions of the data (i.e., the data is new data that has not yet been stored in the non-volatile memory), then an analysis of associated and unassociated valid data units may not be performed, and instead, the method may proceed to block 722. Likewise, at block 712, if the spread of the current version is greater than the spread threshold, then the garbage collection module may not consider blocks storing associated valid data units when selecting the source blocks, and instead the method may proceed to block 722.

In an alternative example method, as denoted by the dotted arrow 724, if the size of the data does not exceed the size threshold, then before selecting source block(s) from the candidate list at block 722, the method may proceed to block 726, where the garbage collection module may access the write task queue and determine a total size of the data that pending write commands in the write command queue are requesting to be written. After determining the total size at block 726, then at block 728, the garbage collection module may determine whether the total size exceeds a total size threshold. If so, then at block 730, the garbage collection module may perform discouraging actions in the candidate list for blocks storing current versions of data requesting to be written by the pending write commands, as previously described. The method may then proceed to block 722, where the garbage collection module may select source block(s) from the candidate list to perform garbage collection. Alternatively, at block 728, if the total size does not exceed the total size threshold, then discouraging actions may not be performed at block 730, and instead the method may proceed directly to block 722 for selection of the source blocks.

Similar alternative example methods may be implemented for block 708 and/or block 712, as denoted by dotted arrows 732 and 734. If there are no current versions of the data being stored in the non-volatile memory at block 708 or if the spread of the current version of the data exceeds the spread threshold at block 712, then before performing source block selection at block 722, the method may proceed to block 726, where the garbage collection module may analyze the write task queue to determine whether to perform any discouraging actions before source block selection.

Other alternative implementations of the method of FIG. 7 may be possible. For example, in other example methods, the garbage collection module may not determine whether a size of the data exceeds a size threshold. Instead, after the garbage collection module determines to perforin garbage collection at block 702, the method may proceed directly to block 708 where the garbage collection module determines if the non-volatile memory is storing a current version of any of the data. In addition or alternatively, the garbage collection module may not determine whether a spread of the current version of the data is within the spread threshold. Instead, after the garbage collection module identifies the block(s) that is/are storing the current version of the data at block 710, the method may proceed directly to block 714, where the garbage collection module may determine the associated and unassociated data units.

In addition or alternatively, the garbage collection module may not determine the total size of the data associated with the pending write commands in the write task queue and whether the total size exceeds the total size threshold at blocks 726 and 728. Instead, if the garbage collection module determines that the data does not exceed the size threshold at block 706, that there are no current versions of the data being stored at block 708, and/or that the spread of the current version is not within a spread threshold, then the method may proceed directly to block 730. Various other ways of implementing the methods of FIG. 7 may be possible.

Lastly, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

We claim:

1. A non-volatile memory system comprising:
   non-volatile memory; and
   a controller configured to:
   associate a first block with a write command queued in a write task queue;
   in response to the association, determine that the first block is in a candidate list;
   in response to the determination that the first block is in the candidate list, identify the first block for performance of a discouraging action that discourages the controller from selecting the first block for transfer of first data in the first block to a different storage area;
   perform the discouraging action associated with the first block;
   after performance of the discouraging action, select a second block in the candidate list for transfer of second data in the second block to the different storage area, wherein the second block has a lower ranking than a ranking of the first block in the candidate list; and
   communicate with the non-volatile memory to transfer the second data in the second block to the different storage area.

2. The non-volatile memory system of claim 1, wherein the determination that the first block is in the candidate list comprises a determination of whether the first block is in an active pool of the candidate list.

3. The non-volatile memory system of claim 1, wherein the controller is further configured to:
   analyze the write task queue;
   identify physical address information associated with the write command in response to the analysis; and
   determine that a current version of data requested to be written by the write command comprises the first data in the first block based on the identification of the physical address information,
wherein the controller is configured to associate the first block with the write command based on the determination that the current version of the data requested to be written comprises the first data in the first block.

4. The non-volatile memory system of claim 3, wherein the controller is configured to analyze the write task queue in response to a triggering event, wherein the triggering event comprises an expiration of a time period, an update event indicative of a possible update to the candidate list, or a queuing of a new write command in the write task queue.

5. The non-volatile memory system of claim 1, wherein the controller is configured to perform the discouraging action by lowering the ranking of the first block to an artificially low ranking.

6. The non-volatile memory system of claim 1, wherein the controller is configured to perform the discouraging action by removing the first block from the candidate list.

7. The non-volatile memory system of claim 1, wherein the controller is configured to perform the discouraging action by appending a tag to an entry of the first block in the candidate list that indicates to the controller not to select the first block for the transfer of the first data to the different storage area, or adding the first block to a do not select list.

8. The non-volatile memory system of claim 1, wherein the transfer of the second data to the different storage area is part of a garbage collection process, and wherein the controller is further configured to erase the second block after the transfer of the second data as part of the garbage collection process.

9. The non-volatile memory system of claim 8, wherein the controller is further configured to write data associated with the write command into the second block after the second block is erased.

10. A method comprising:
identifying, with a controller of a non-volatile memory system, a write command in a write task queue, the write command requesting first data to be written to non-volatile memory;
associating, with the controller, a first block of the non-volatile memory with the write command by identifying, with the controller, that the first block of the non-volatile memory is storing a current version of the first data;
determining, with the controller, that the first block is in a garbage collection candidate list in response to the associating;
in response to determining that the first block is in the garbage collection candidate list, sorting, with the controller, the garbage collection candidate list to discourage the controller from selecting the first block as a source block for a garbage collection process;
selecting, with the controller, a second block in the garbage collection candidate list as a source block instead of the first block for the garbage collection process, wherein the second block has a lower ranking than a ranking of the first block in the candidate list; and
transferring, with the controller, second data stored in the second block to a destination block to perform the garbage collection process.

11. A non-volatile memory system comprising:
non-volatile memory; and
means for associating the first block with the write command queued in the write task queue;
means for determining that the first block is in the candidate list in response to the association;
means for identifying the first block for performance of a discouraging action that discourages selecting the first block for transfer of first data in the first block to a different storage area in response to the determination that the first block is in the candidate list;
means for performing the discouraging action associated with the first block;
means for selecting a second block in the candidate list for transfer of second data in the second block to the different storage area after performance of the discouraging action, wherein the second block has a lower ranking than a ranking of the first block in the candidate list; and
means for communicating with the non-volatile memory to transfer the second data in the second block to the different storage area.

12. The non-volatile memory system of claim 11, wherein the means for determining that the first block is in the candidate list comprise means for determining whether the first block is in an active pool of the candidate list.

13. The non-volatile memory system of claim 11, further comprising:
means for analyzing the write task queue;
means for identifying physical address information associated with the write command in response to the analysis; and
means for determining that a current version of data requested to be written by the write command comprises the first data in the first block based on the identification of the physical address information,
wherein the means for associating comprises means for associating the first block with the write command based on the determination that the current version of the data requested to be written comprises the first data in the first block.

14. The non-volatile memory system of claim 11, wherein the means for performing the discouraging action comprises means for lowering the ranking of the first block to an artificially low ranking.

15. The non-volatile memory system of claim 11, wherein the means for performing the discouraging action comprises means for removing the first block from the candidate list.

16. The non-volatile memory system of claim 11, wherein the means for performing the discouraging action comprises means for appending a tag to an entry of the first block in the candidate list that indicates not to select the first block for the transfer of the first data to the different storage area, or adding the first block to a do not select list.

* * * * *